(12) United States Patent
Thaury et al.

(10) Patent No.: US 11,576,251 B2
(45) Date of Patent: Feb. 7, 2023

(54) REFLECTIVE OPTICAL SYSTEM

(71) Applicants: Ecole Polytechnique, Palaiseau (FR); Ecole Nationale Supérieure de Techniques Avancées, Palaiseau (FR); Centre National de La Recherche Scientifique, Aris (FR); Yeda Research and Development Co. Ltd., Rehovot (IL)

(72) Inventors: Cédric Thaury, Montigny le Bretonneux (FR); Slava Smartsev, Petah Tikva (IL)

(73) Assignees: Ecole Polytechnique, Palaiseau (FR); Ecole Nationale Supérieure de Techniques Avancées, Palaiseau (FR); Centre National de La Recherche Scientifique, Paris (FR); Yeda Research and Development Co. Ltd., Rehovot (IL)

( * ) Notice: Subject to any disclaimer, the term of this patent is extended or adjusted under 35 U.S.C. 154(b) by 0 days.

(21) Appl. No.: 17/255,519

(22) PCT Filed: Jun. 24, 2019

(86) PCT No.: PCT/EP2019/066679
§ 371 (c)(1),
(2) Date: Dec. 23, 2020

(87) PCT Pub. No.: WO2020/002243
PCT Pub. Date: Jan. 2, 2020

(65) Prior Publication Data
US 2021/0274631 A1 Sep. 2, 2021

(30) Foreign Application Priority Data

Jun. 26, 2018 (EP) .................................. 18305810

(51) Int. Cl.
*H05H 1/54* (2006.01)
*H01S 3/00* (2006.01)

(52) U.S. Cl.
CPC ............. *H05H 1/54* (2013.01); *H01S 3/0071* (2013.01)

(58) Field of Classification Search
CPC ......... H05H 1/54; H05H 15/00; H01S 3/0071
See application file for complete search history.

(56) References Cited

U.S. PATENT DOCUMENTS

| 3,476,463 A | 11/1969 | Kreuzer |
| 2011/0273115 A1* | 11/2011 | Liu ........................ H05H 15/00 315/500 |

(Continued)

OTHER PUBLICATIONS

International Search Report received from the European Patent Office in International Application No. PCT/EP2019/066679 dated Sep. 13, 2019.

(Continued)

*Primary Examiner* — Minh D A
(74) *Attorney, Agent, or Firm* — The Marbury Law Group, PLLC (57) ABSTRACT

A reflective optical system (100) comprising at least one reflective aspheric surface (1) of focal length $f_0$ and optical axis (Z), the surface being configured so that an incident laser beam (2) propagating along an axis (Z') is focused along the optical axis (Z) with a FWHM ((Full Width at Half Maximum) of the intensity of the reflected beam along the optical axis (Z) being larger, preferably by a factor of at least 10, than the FWHM of the intensity of a focused beam reflected by a parabola having same focal length $f_0$ and same optical axis (Z), receiving same beam.

14 Claims, 5 Drawing Sheets

(56) References Cited

U.S. PATENT DOCUMENTS

| | | | | |
|---|---|---|---|---|
| 2012/0132827 A1* | 5/2012 | Fukuda | ................. | H05H 15/00 |
| | | | | 250/423 P |
| 2016/0113814 A1* | 4/2016 | Bischoff | ............... | H01S 3/0071 |
| | | | | 219/121.67 |
| 2018/0133837 A1 | 5/2018 | Greenberg et al. | | |

OTHER PUBLICATIONS

Written Opinion of the International Searching Authority in International Application No. PCT/EP2019/066679 dated Jan. 2, 2020.
Tajima, T. et al., "Laser Electron Accelerator," Physical Review Letters, vol. 43, No. 4, Jul. 23, 1979, pp. 267-270.
Leemans, W.P. et al., "Multi-GeV Electron Beams from Capillary-Discharge-Guided Subpetawatt Laser Pulses in the Self-Trapping Regime," Physical Review Letter, PRL 113, Dec. 2014, pp. 245002-1-245002-5.
Thévenet, M et al., "Vacuum laser acceleration of relativistic electrons using plasma mirror injectors," Nature Physics, vol. 12, Apr. 2016, pp. 355-361.
Malka, V. et al., "Electron Acceleration by a Wake Field Forced by an Intense Ultrashort Laser Pulse," Science Magazine, vol. 298, Nov. 22, 2002, pp. 1596-1600, (http://science.sciencemag.org/content/298/5598/1596#BIBL).

* cited by examiner

REFLECTIVE OPTICAL SYSTEM

CROSS REFERENCE TO RELATED APPLICATIONS

This application in a National Phase Application claiming priority to International Application No. PCT/EP2019/066679 filed Jun. 24, 2019, which claims priority to European Application No. 18305810.6, filed on Jun. 26, 2018, both of which are incorporated by reference herein in their entirety.

The present invention relates to an optical system for laser particle accelerators and other applications.

DESCRIPTION OF THE RELATED ART

Laser plasma acceleration (LPA) is a laser-based particle acceleration technique relying on plasma-channel guiding of ultrashort laser pulses to reach high energies. This technique allows to obtain ultrashort bunches of mono-energetic electrons of high quality and low emittance (<1 mm·mrad). As the laser propagates in the plasma channel, the ponderomotive force causes the electrons to be expelled from the optical axis, which leads to the formation of a cavity free of electrons in its wake, referred to as the bubble (see T. Tajima and J. M. Dawson, "Laser Electron Accelerator", *Phys. Rev. Lett.* 43, 267 (1979)). The electric fields in this ion cavity are referred to as wakefields and reach amplitudes of a few hundreds GV/m (V. Malka, et al, "Electron Acceleration by a Wake Field Forced by an Intense Ultrashort Laser Pulse", *Science* 298, 1596-1600 (2002)). They can therefore accelerate electrons that are trapped into the cavity to energies reaching hundreds of MeV over few millimeters, while tens of meters would be necessary to produce the same levels of energy with conventional acceleration techniques.

Still, a major issue with LPA is that this technique is not able to maintain the pulse intensity over long distances in a low plasma density, which is often required for applications that involve high intensity laser-plasma interactions.

One solution to this issue is to focus the laser beam into a channel constituted of a preformed plasma. To that end, a plasma is formed on the optical axis of the laser to be guided. The plasma expands hydrodynamically, leading after a few nanoseconds to a parabolic density profile which acts as a lens for the laser. The resulting plasma channel has the effect of a waveguide for the laser pulse.

In particular, it limits diffraction effects and maintains the pulse intensity over long distances of propagation greater than the Rayleigh distance. The technique of plasma waveguiding channel can be performed in two different ways using a capillary discharge or a laser heater.

Capillary discharge is a technique that uses a dielectric capillary tube with a diameter on the order of magnitude of several hundred microns, which is filled with gas. The gas is ionized by a high voltage which is produced by a pair of electrodes located at each end of the capillary. Within the capillary, the region near the wall remains cold while collisional heating near the axis causes a plasma expansion and the formation of a plasma with low density used as a waveguiding channel. The best performance reported so far for LPA electron energy is 4 GeV obtained with a 16 J, 40 fs laser pulse using a 9-cm capillary discharged waveguide (See W. P. Leemans et al, "Multi-GeV Electron Beams from Capillary-Discharge-Guided Subpetawatt Laser Pulses in the Self-Trapping Regime," Phys. Rev. Lett. 113, 245002 (2014)). In theory, capillary discharge could be used to create a plasma channel over distances larger than 10 cm. In practice, plasma discharge significantly limitates the scope of this technique. Moreover, the dielectric capillary tube has a relatively low laser damage threshold which questions its relevance for multi-PW and/or high repetition rate lasers.

The second technique relies on the on-axis heating of a neutral gas column with a laser pulse. During heating, the gas near the axis expands radially, therefore creating a local decrease in density, which leads to the formation of a plasma wave-guiding channel. To heat and ionize the neutral gas, a high-energy, long laser pulse is employed. This is a difficult operation, which requires high laser energy. In particular, the heating pulse has to be precisely focused over a line located in the gas column, using axicon or axilens for example. However these elements are not well suited for broadband spectrum and high intensity lasers since they are wavelength dependent and have a low laser damage threshold. Because of the limited laser-intensity, the plasma is heated via collisional heating, which is inefficient at a low plasma density, for example lower than $10^{18}$ cm$^{-3}$. As low densities are required to produce very high energy charged particles, for example higher than 1 GeV, the technique is not appropriate for high-energy laser-plasma acceleration.

It is desirable to have a system that obviates all or part of the abovementioned drawbacks and that makes it possible to focus a high-intensity laser beam over a relatively long distance.

SUMMARY OF THE INVENTION

Exemplary embodiments of the invention aim to satisfy this need and relate to a reflective optical system comprising at least one reflective aspheric surface of focal length $f_0$ and optical axis, the surface being configured so that an incident laser beam propagating along an axis of incidence is focused along the optical axis with a FWHM (Full Width at Half Maximum) of the peak intensity of the reflected beam along the optical axis being larger than the FWHM of the peak intensity of a focused beam reflected by a parabola having same focal length $f_0$ and same optical axis, receiving same beam.

For example the FWHM of the peak intensity of the reflected beam is larger by a factor of at least 2, better of at least 10, even better of at least 20, than the FWHM of the peak intensity of the focused beam reflected by a parabola having same focal length $f_0$ and same optical axis.

Preferably, the FWHM of the peak intensity of the reflected beam along the optical axis is larger than the FWHM of the peak intensity of a focused beam reflected by a parabola having same focal length $f_0$, same optical axis and same numerical aperture as the at least one reflective surface, receiving same beam.

When illuminated by a Gaussian beam with a waist $W_i$ and a wavelength $\lambda$, the at least reflective aspheric surface allows to obtain a FWHM of the peak intensity larger than $$\frac{2\pi w_0^2}{\lambda},$$

better larger than $$2\frac{2\pi w_0^2}{\lambda},$$

even better larger than $$3\frac{2\pi w_0^2}{\lambda}.$$

The waist $w_0$ relates to the focused illumination beam by a parabola with $f_0$ as a focal length. Waists $W_i$ and $w_0$ satisfy $$w_0 = \frac{\lambda f_0}{\pi W_i}.$$

The shape of the transverse section of the laser beam may be circular or non circular, for example polygonal, for instance rectangular, triangular or hexagonal. The transverse section may be full or hollow, for example ring shaped. Preferably, the transverse section is circular.

High intensity laser pulse refers to a laser pulse with an optical peak intensity greater than $10^{16}$ W/c m$^2$, better larger than $10^{18}$ W/c m$^2$, even better larger than $10^{19}$ W/cm$^2$.

The peak intensity I of a laser source, assuming an uniform intensity over time, is defined as follows:

$$I(W\ cm^{-2}) = \frac{E(J)}{\tau(s) \times a(cm^2)},$$

where E is the energy of the laser source, $\tau$ is the duration of the laser pulse and a is the area of the transverse section of the laser beam.

A long focal line refers to a focal line which is larger than the FWHM of a parabola mirror of the same focal length $f_0$ and same optical axis illuminated with the same incident laser beam. Preferably, the parabola mirror has the same numerical aperture as the at least one reflective aspheric surface.

Ultrashort Laser Pulses are considered to be those whose duration is less than ten picoseconds, better comprised between 5 and 500 femtoseconds. The pulse duration is defined as usual by the peak width at −3 dB.

A deformable reflective surface refers to an optical device with a controllable reflective surface shape set to control the wavefront and correct optical aberrations. These aberrations may distort the propagating wave along the optical path and thus degrade the laser source performance. The deformable reflective surface shape may be obtained by deforming the optical device with at least one actuator. The deformable reflective surface may be a bimorph deformable mirror or a membrane deformable mirror.

The term center of an optical device refers to the intersection between the optical axis and the optical device.

The laser group velocity gives the velocity with which the envelope of a laser pulse propagates through a medium.

The term dephasing refers to the case where charged particles reach the decelerating region of the wakefield. It occurs because the laser group velocity is smaller than charged particles velocities.

According to the invention, when designing the at least one reflective aspheric surface, the length of the focal line can be chosen independently from the transverse dimension of the reflected beam. Hence, the invention enables to obtain a long focal line with a narrow transverse section. This aspect is advantageous for a variety of applications, such as optical guiding of particles and formation of a plasma waveguiding.

The reflective aspheric surface according to the invention combines both properties of long focal line and high energy concentration. The reflective aspheric surface may be useful for several applications including ultrashort laser pulse compression, extending the length of plasma filaments generated by intense laser pulses, THz generation lightning control, and guiding intense laser pulses for laser wakefield accelerators.

The invention has applications in many fields for which the ability to keep high optical intensity over large distances of interaction is beneficial. These applications include x-ray laser medium, laser accelerators and harmonic generators, inter alia.

A reflective aspheric surface according to the invention may present several advantages compared to known axilens and axicons optics: it is by nature achromatic and has a high damage threshold; it can thus be used with intense laser pulses to produce high intensity over long focal lines. Moreover, the invention offers a solution for controlling the velocity of the laser along the focal line independently from the laser peak intensity.

According to some embodiments, the at least reflective aspheric surface is configured so that rays that impinge the at least one reflective aspheric surface at a given distance r from the optical axis with r≤R may be focused at a distance from the center O of the at least one reflective aspheric surface given by $f(r)=f_0+z_g(r)$, where $z_g(r)$ is a function depending on r and R is distance of the outer rays from the axis of incidence.

f(r) is for example a polynomial function with at least one coefficient of order n with n>0 which is not zero.

The function $z_g(r)$ may depend on the desired distribution of the peak intensity along the focal line, according to the following equation:

$$I_{ref}(z_g)dz_g(r)=2\pi K I_{inc}(r)rdr,$$

where $I_{ref}(z_g)$ is the peak intensity of the reflected beam along the focal line, $I_{inc}(r)$ is the peak intensity of the incident beam and K is a parameter depending on the length of the focal line and the area of the transverse section of the reflected beam.

When the peak intensity of the incident laser beam is approximately constant i.e $I_{inc}(r)=I_0$, the function $z_g(r)$ may correspond to:

$$z_g(r)=\delta(r/R)^2,$$

where $\delta$ is a constant.

$\delta$ may be negative, in which case outer rays may be focused first.

In a variant, $\delta$ may be positive, in which case on axis rays may be focused first.

The at least one reflective aspheric surface may be described using a sag function s. Assuming that r is the distance from the optical axis in a plane perpendicular to this axis, the sag function s may be given by the following equation:

$$r\frac{ds}{dr} = s(r) - f(r) + \sqrt{[s(r)-f(r)]^2 + r^2}.$$

At least one high order derivative term of the sag function s is not zero.

$$\left|\frac{d^n s}{dr^n}\right| > \text{ for } n > 2.$$

The sag function s may be described by a polynomial series. For example, the s(r) is a polynomial function of order greater or equal to 6.

The axis of incidence may coincide with the optical axis. In this case, the at least one reflective aspheric surface may have a rotational symmetry and its sag may be defined by a function s that only depends on the radial coordinate r. A solution for the sag function s can be obtained analytically as a power series of the radial coordinate r.

The axis of incidence may make a non-zero angle θ, referred to as off-axis angle in the following, with the optical axis. For example, this angle θ is ranging from 5 to 30°. In this case, the at least one reflective aspheric surface may have no polar symmetry and the sag function s may involve the two transverse coordinates x and y. An approximation of the sag function s may be obtained using numerical optimization tools as a series of two dimensional polynomial expansions.

The sag s of the at least one aspheric reflective surface is not a spherical surface, i.e.

$$s(r) \neq \frac{cr^2}{1 + \sqrt{1 - c^2 r^2}},$$

where c is the curvature of spherical surface.

The reflective aspheric surface may have an opening. This opening may be located in its center. This aspect is of particular interest for applications including laser waveguiding since it allows a second laser beam to go there through as will be further explained below. For example, the second laser beam is focused by a reflective optics prior to go through the opening.

According to another embodiment of the present invention, the at least one reflective aspheric surface may have a non-continuous surface to improve the performances of the system for a large f-number N and an off-axis angle θ. As stated previously, applications including waveguiding or LPA may require a focused beam with few deformations and small transverse section. By using a non-continuous surface, on may ensure that the focal line does not exhibit large transverse sections and significant curvature, even for large values of Nθ.

According to some embodiments of the present invention, the at least one reflective aspheric surface may be a deformable reflective surface. By using a deformable reflective surface, one may pre-compensate for alignment and intrinsic optical errors that degrade the focusing power of the laser source and/or may tune the length and the intensity along the focus line. The at least one reflective aspheric surface may comprise a reflective coating of a metal or a dielectric, such as aluminum, chromium, nickel, silver or gold and their alloys.

At least one coating may be applied on the surface of the aspheric surface to modify the phase in a define way. The coating may be configured to yield a spiral phase around the optical axis. The spiral phase may be obtained by using a coating whose thickness increases proportionally to the azimuthal angle around a center of the reflective aspheric surface, yielding a similar increase of the phase. As a result the reflective aspheric surface covered by the coating of variable thickness converts a beam with a plane wavefront to a helical wave front beam with a singularity phase at its optical axis, i.e. an optical vortex beam.

In alternative embodiment, the at least one aspheric surface may be used with a second transmissive optics, for example a phase plate to generate the spiral phase.

Advantageously, the spiral phase may be incorporated in the sag as azimuthal dependence. This variant is of interest because it makes it possible to obtain a spiral phase without additional coating and without using a second optics.

The at least one reflective aspheric surface may be produced using a diamond-cutting technology to shape a glass, a plastic or a metallic substrate and a vacuum deposition technology to form the reflective surface.

Laser Focusing

The present invention further includes a method of focusing an incident laser pulse beam, comprising: generating at least one laser pulse using a laser source and focusing the laser pulse using the optical system of the present invention as defined above.

The optical system may be used in combination with any other focusing optical device(s).

The invention also relates to a method of focusing an incident laser beam by means of the optical system of the present invention and another optical device(s). The method comprises generating and directing at least one laser pulse towards the another optical device, and focusing the beam provided from the another optical device with the reflective optical system of the invention as defined above. This another reflective optics may include a cylindrical reflective optics, a spherical reflective optics or an aspheric reflective optics, a phase plate, a reflective optics with define phase, for example a spiral phase.

Plasma Generation

An additional aspect of the invention includes a method for generating a plasma comprising generating at least one laser pulse and focusing the at least one laser pulse in a gas medium using the reflective optical system of the invention to produce a plasma.

The laser source may have a power of tens of megawatts, a few terawatts, or tens of terawatts or more. The laser source may emit pulses which may be shorter than ten nanoseconds, advantageously shorter than one hundred of femtoseconds. The laser source may have an energy ranging from 0.1 mJ to 1 kJ, for instance 10 mJ or more.

The laser beam emitted by the laser source may have a wavelength ranging from 300 nm to 10200 nm, for instance 800 nm.

The gas in the medium may be provided by a nozzle, filled inside a cell or provided otherwise.

The gas cell may have at least one opening to enable the entrance of a laser beam.

The gas cell may not have an opening. In this case, the laser ablates the opening.

The gas can be of any suitable type, for instance helium, hydrogen, nitrogen, neon, argon or a mixture of those gases. When the reflective aspheric surface yields a spiral phase or when the reflective aspheric surface is used in combination with a spiral phase plate, the resulting plasma may be in the form of hollow channel plasma.

The interaction between the laser beam and the gas medium over a long focal line causes the formation of a plasma channel. The length of the plasma channel may be the same as the length of the focal line. Thus, the length of the plasma channel may be greater than the FWHM of the peak intensity of a parabola with the same focal length $f_0$ and the plasma channel may have a narrow transverse section. This is beneficial for guiding a second laser pulse.

Laser Plasma Guiding

The invention also relates to a method of guiding a laser pulse over a long focal line comprising generating at least one first laser pulse by a first laser source, focusing the at least one first laser pulse in a gas medium using the optical system in accordance with the invention, therefore producing a plasma channel waveguide capable of guiding a second laser pulse, and directing at least one second laser pulse to be guided originating from a second laser source along the longitudinal axis of the plasma waveguide channel. Hence, the at least second laser pulse can be guided along the axis of the plasma channel over a long focal line.

In an alternative embodiment, the at least one second pulse may be focused into the plasma using an optical focusing element, for example a reflective optics such as a parabola mirror, a lens or any common focusing optics or by any other way.

Plasma channel waveguiding is beneficial for applications such as laser-plasma charged particle acceleration. The narrow transverse section of the plasma channel makes it possible to confine a second laser pulse, therefore enabling interactions between the second laser pulse and charged particles over a long focal line. Moreover, the use of a wave-guide allows to decrease the plasma density, which leads to reach higher energies of the accelerated charged particles.

Acceleration Using Two Lasers

According to a further aspect of the invention, a laser-plasma charged particle accelerator is provided, comprising a first laser source for generating at least one first laser beam to produce a plasma channel waveguide, the reflective optical system in accordance with the invention, a gas medium in which the at least one first laser beam is focused by said optical system to produce the plasma channel waveguide, hence creating a plasma waveguide channel, the particles being accelerated by the first laser source and/or the accelerator comprising a second laser source that generates at least one second laser beam to be directed along the axis of the plasma waveguide channel. The at least one second laser pulse is therefore guided over the plasma waveguide, along which it interacts with the charged particles and accelerates them. The charged particles originate either from an external accelerator, or from the plasma itself.

In an alternative embodiment, the laser-plasma charged particle accelerator includes an optical focusing element to focus the at least one second laser pulse into the plasma. The optical focusing element may be a lens or a mirror or any other focusing element.

The charged particles may be electrons or positrons.

The second laser source may have a power greater than one hundred of megawatts, one hundred of terawatts or one petawatt. The second laser source may emit pulses, which may be shorter than ten nanoseconds, better shorter than one hundred of femtoseconds. The second laser source may have an energy ranging from ten millijoules to ten joules, for instance about a hundred of millijoules.

In some embodiments, the laser charged particle accelerator may comprise an additional charged particle source. The charged particle source may be an external accelerator, for example a plasma accelerator, a laser-plasma accelerator or a linear particle accelerator using a cold cathode, a hot cathode, a photocathode or a Radio-Frequency accelerator. This variant is of in interest for staged accelerators where particles accelerated in a previous stage are reaccelerated at the next stage.

The optical system according to the invention allows to rise up the laser group velocity to the velocity of the charged particles. This allows to partially or completely suppress the dephasing phenomena. In order to completely suppress the dephasing phenomena, additional optics may be used, for example a doublet lens. The additional optics will allow to delay a different part of the beam, thus controlling the speed of the envelope along the focal line.

The use of an optical system of the invention opens up perspectives for accelerating charged particles with energies up to the 100 GeV range with a multi-PW laser source, or in the 10-100 MeV range with a mJ, KHs laser system.

Acceleration in Vacuum

Further embodiments of the invention relate to a vacuum laser-plasma charged particle accelerator, comprising a laser source for generating at least one high intense laser pulse, a particle source, an acceleration zone under vacuum, for example a vacuum chamber, and an optical system as defined above.

The particle source may be a plasma mirror. A plasma mirror is a dense plasma resulting from the ionization of an initially solid target irradiated by intense femtosecond laser pulses. A description of plasma mirrors can be found, for instance, in (Thevenet et al., Nature Physics 12, 355-360 (2016), doi: 10.1038) and in references cited therein.

The acceleration zone under vacuum may be a chamber under vacuum at a pressure of or less than $10^{-2}$ mbar, better $10^{-4}$ mbar.

Exemplary embodiments of the present invention relate to a reflective optical system comprising at least one reflective aspheric surface of focal length $f_0$ and optical axis, the surface being to be illuminated with an incident laser beam along the parallel direction of an axis of incidence, the at least one reflective surface being configured so that rays of the incident laser beam that impinge the at least one reflective aspheric surface at a given distance r from the axis of incidence with r≤R are focused at a distance f(r) from the intersection O of the optical axis with the at least one reflective aspheric surface, with $f(r)=f_0+z_g(r)$, where $z_g(r)$ is a function depending on r and R is distance of the outer rays from the axis of incidence.

The surface according to these embodiments may exhibit features of the invention as disclosed above.

It is to be understood that both the general description above and the detailed description below are exemplary only and are not restrictive of the scope of the invention.

BRIEF DESCRIPTION OF THE DRAWINGS

The accompanying drawings, which are incorporated in and constitute a part of the specification, illustrate presently preferred embodiments of the invention, and together with the description, serve to explain the principles of the invention. In the drawings.

Whenever possible, the same reference numbers will be used throughout the drawings to refer to the same or like parts.

Figure 1A:
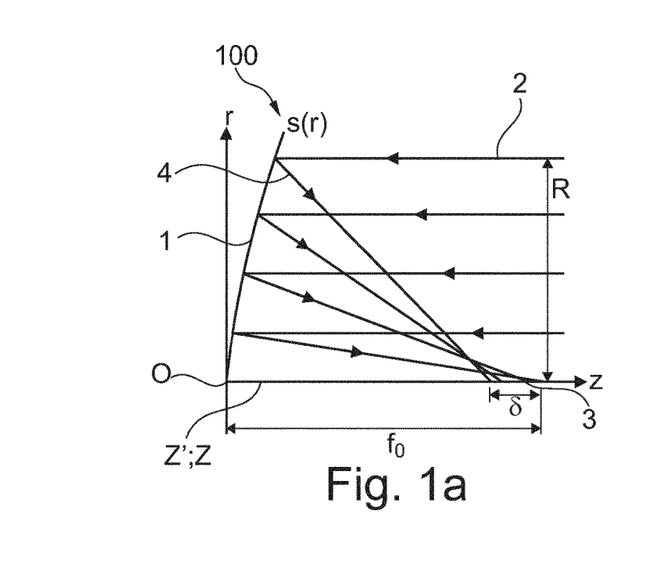
FIG. 1a, 1b, 1c are illustrations of different embodiments of a method according to the invention.
Figure 1B:
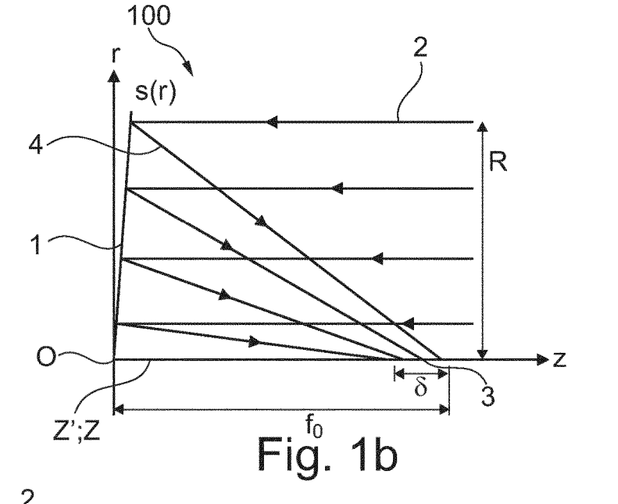
Figure 1C:
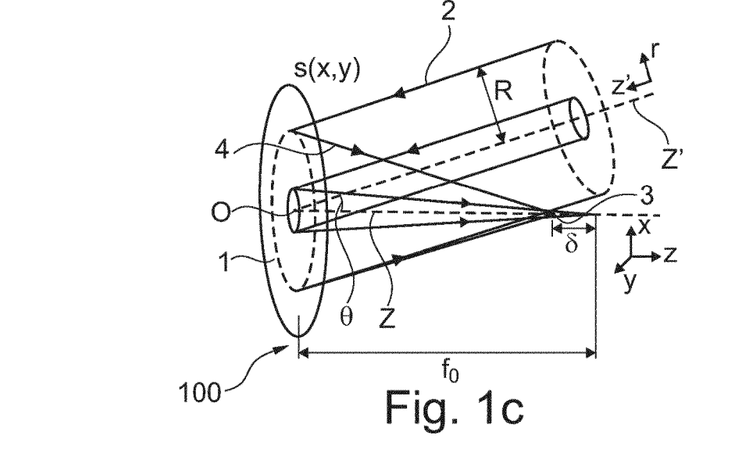

In accordance with the invention, and as broadly embodied, in FIGS. 1a, 1b and 1c, an optical system 100 is provided.

The optical system 100 includes a reflective aspheric surface 1 with an optical axis Z and a focal line 3.

As shown in FIG. 1a, a laser beam 2 is incident along the axis of incidence Z' and is deviated towards the optical axis Z.

The reflective surface 1 is configured so that rays of the incident laser beam 2 that impinge the reflective aspheric surface 1 at a given distance r from the optical axis Z are focused on the optical axis Z at a position z=f(r) from the center O of the reflective aspheric surface 1. The distance between the position f(r) and the center O of the reflective aspheric surface 1 depends upon r following the equation $z=f(r)=f_0+z_g(r)$, where $z_g(r)$ is a function depending on r. The focal line 3 corresponds to the zone where the reflected rays cross the optical axis.

The function $z_g(r)$ is related to the peak intensity of the incident laser beam and the peak intensity of the reflected laser beam according to the following relationship:

$$I_{ref}(r)dz_g(r)=2\pi K I_{inc}(r)rdr,$$

where K is a parameter depending on the length of the focal line and the area of the transverse section of the reflected beam.

When the peak intensity of the incident laser beam is approximately constant i.e $I_{inc}(r)=I_0$, the peak intensity of the reflected beam is also approximately constant over the focal line 3 and the function $z_g(r)$ can be approximated as:

$$z_g(r)=\delta(r/R)^2,$$

where R is distance of the outer rays from the axis of incidence (Z') and δ is a constant whose absolute value is equal to the length of the focal line 3.

FIG. 1a shows an embodiment of the reflective aspheric surface 1 where the constant δ is positive. In this case, on-axis rays are focused first and $f_0$ corresponds to the distance from the center O to the start of the focus. The focal line 3 for the reflective aspheric surface 1 is defined by a set of positions z such that $f_0 \leq z \leq f(R)$, which leads to a focal line 3 of length δ.

FIG. 1b shows an alternative embodiment where δ is negative. In this case outer-axis rays are focused first and $f_0$ corresponds to the distance from the optics to the end of the focus. The focal line 3 for a reflective aspheric surface 1 is defined by a set of positions z such that $f(R) \leq z \leq f_0$, which leads to a focal line 3 of length |δ|.

FIGS. 1a and 1b display an exemplary embodiment of the reflective aspheric surface 1 where the axis of incidence Z' coincides with the optical axis Z. In this case the reflective aspheric surface 1 has a rotational symmetry. Consequently, its sag function s only depends on the radial coordinate r.

A solution for the sag function s in the on-axis case may be obtained analytically as a power series of the radial coordinate r. For example, in case where the peak intensity of the incident beam is constant, the sag function s is given by:

$$s(r) = \frac{1}{4f_0}r^2 + \frac{\delta}{8f_0^2 R^2}r^4 + \frac{\delta(8f_0\delta - R^2)}{96f_0^4 R^4}r^6 + O(r^8).$$

Referring to FIG. 1c, another embodiment of a reflective aspheric surface used to focus the incident laser beam 2 is disclosed. In this embodiment, the axis of incidence Z' makes an off-axis angle θ with the optical axis Z. The reflective aspheric surface 1 in this case may have no rotational symmetry. Its sag function s may involve two transverse coordinates x and y in a Cartesian coordinate system. The sag function s can be expressed as an expansion of polynomial functions which minimizes a merit function. The coefficients of the polynomial functions may be obtained by minimizing the discrepancy between the location of the reflected laser beam as simulated with some set of coefficients and the targeted location as defined by the formula f(r) given above, through an iterative optimization procedure. To that end, a numerical optimization software such as Zemax may be used.

The reflective aspheric surface 1 creates a correlation between the distance r and the position z along the focal line 3. Therefore, the intensity peak, which is formed from different parts of incident beam, can propagate with superluminal velocity in vacuum. For the case of a uniform intensity along the line, the peak accelerates and deaccelerates for δ>0 and δ<0 respectively.

Figure 3:
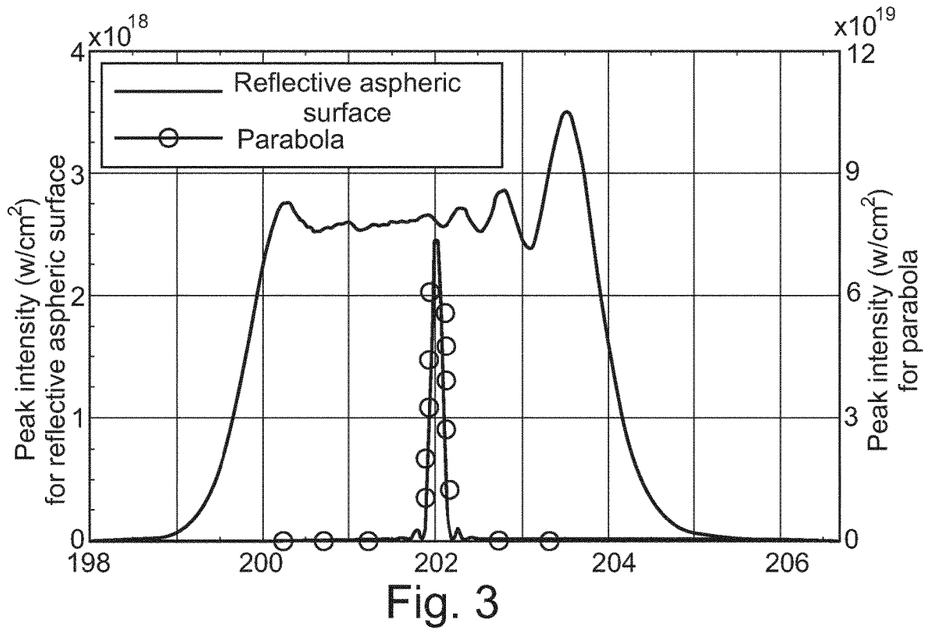
FIG. 3 is an example of a variation of a laser peak intensity along the focal line.

FIG. 3 compares the peak laser intensity corresponding to a reflected laser beam 4, along the focal line 3 as obtained using the reflective aspheric surface 1 and as obtained using a reflective optical device, for example a parabola mirror, for δ=5 mm, $f_0$=200 mm, R=21 mm, λ=800 nm and a 10 TW laser source. Both the aspheric surface 1 and the parabola mirror have an aperture in their center with a radius of 8.5 mm.

The peak intensity of the reflected beam in the case the reflective surface (1) is larger than $10^{18}$ Wcm$^{-2}$ is over more than 4 mm. Hence the Full Width at the maximum is approximately 4 mm, which corresponds to an increase nearly by a factor of 30 of the FWHM of the peak intensity, when compared to a parabola mirror with same numerical aperture. Hence only about 10 mJ and 100 mJ are required to produce a plasma waveguide over 1 cm and 10 cm, respectively.

Figure 4:
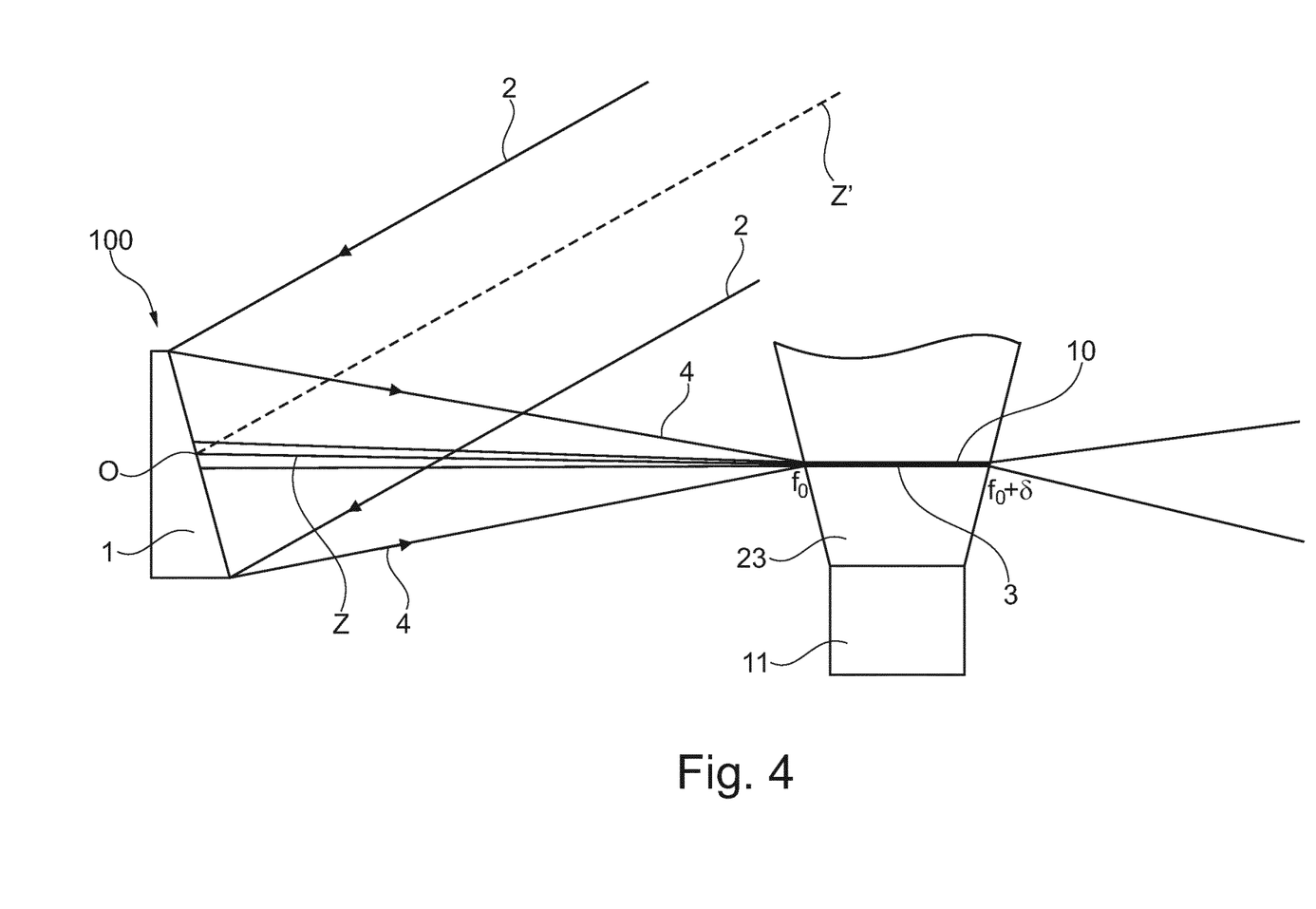
FIG. 4 is an illustration of an embodiment of a plasma creation according to the invention.

Reference is now made to FIG. 4, which is an example of a plasma creation by means of the reflective aspheric surface 1, a gas medium 23 provided by a nozzle 11, and a laser source (not shown) emitting a laser beam 2. The latter is focused into the gas medium 23 by the reflective aspheric surface 1. When the reflected laser beam 4 enters the gas medium 23, the latter is ionized thus forming a plasma 10.

Example of Hydrogen Gas

As shown in FIG. 3, the peak intensity may be larger than $10^{18}$ Wcm$^{-2}$, which is higher than the threshold for barrier suppression ionization for Hydrogen, which is on the order of magnitude of $510^{14}$ Wcm$^{-2}$. As a result, the reflected laser beam 4 is strong enough to fully ionize an Hydrogen gas and hence generate a plasma channel. When the reflected beam 4 propagates along the gas medium, the energy the electrons in the plasma electrons is raised up to the ponderomotive energy, which is about 200 keV. The peak intensity and the ponderomotive energy are about 4 orders of magnitude larger than those typically obtained with an axicon lens and a similar laser source. Waveguides based on axicons lenses have to rely on collisional ionization, which is inefficient for electronic densities $n_e$<$10^{18}$ cm$^{-3}$. In contrast, with the invention, the efficiency of the ionization is independent from the electronic density $n_e$; thus, the reflective aspheric surface 1 can generate a plasma at arbitrarily low densities.

Moreover, because of very different plasma temperatures, plasmas generated with the reflective aspheric surface 1 expand much faster than those produced with axicons lenses. Indeed the expansion velocity of a Hydrogen gas is $$\left(k_b \frac{T}{M}\right)^{\frac{1}{2}} 10^{-3} T[\text{keV}]^{\frac{1}{2}} c,$$

M being the proton mass; a plasma channel of ~10 μm radius will thus be formed after ~10 ps with a reflective aspheric surface 1, while ~1 ns would be required with an axicon lens.

Figure 5:
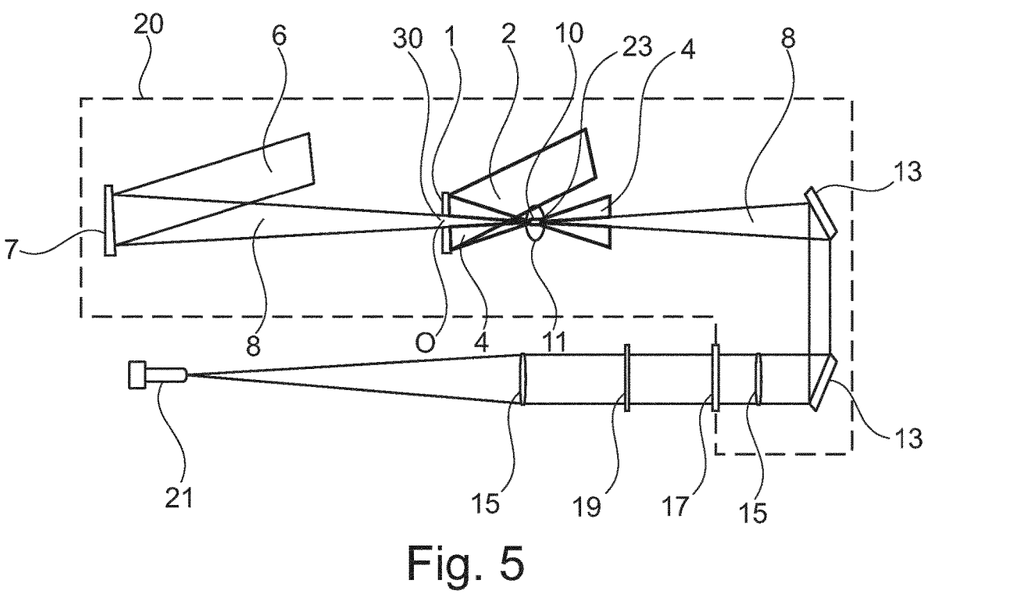
FIG. 5 is an illustration of another embodiment of a method according to the invention.

FIG. 5 illustrates a method according to the invention. A first laser source generates at least one first laser pulse directed toward the reflective aspheric surface 1. The laser beam 2 resulting from the at least one laser pulse is then reflected by the reflective surface 1 and the reflected beam 4 is focused over a long focal line. The interaction between the reflected laser beam 4 and the gas medium 23 provided by a nozzle 11 leads to the formation of a plasma waveguide channel 10. The reflective aspheric surface 1 has a hole formed in its center O so as to allow a laser beam 8 to pass therethrough. The laser beam 8 is obtained by reflecting a laser beam 6 generated by the first laser source or a second laser source using a reflective optical device 7 such as a parabola mirror. The laser beam 8 is then guided over the plasma channel 10. A set of two reflective elements 13 and of two focusing elements 15 and neutral density filters 19 may be used to attenuate the laser beam 8 at the exit of the gas medium 23 and measure its peak intensity profile at focus using a suitable measurement tool including a CCD 21 camera.

A vacuum chamber 20 may be provided to host the above-mentioned elements. The vacuum chamber 20 can be set and maintained under vacuum using one or several vacuum pumps. The vacuum chamber 20 can be provided with a window 17 allowing the reflected beam 8 to leave the vacuum chamber 20.

Figure 6A:
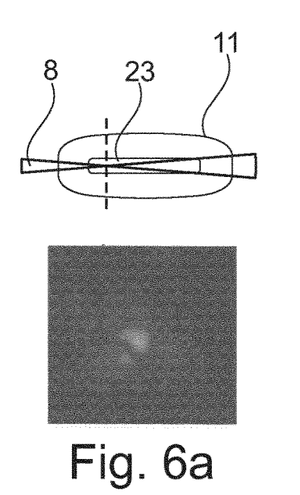
FIG. 6 is an illustration of focal spots of a laser beam obtained at the inlet of a gas medium and at its outlet with and without a plasma channel waveguide.
Figure 6B:
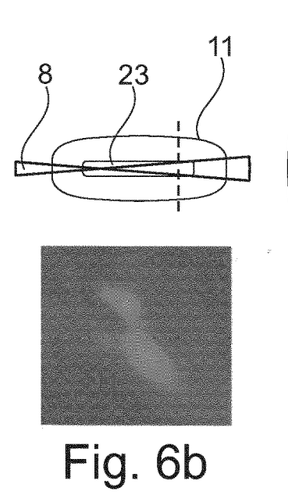
Figure 6C:
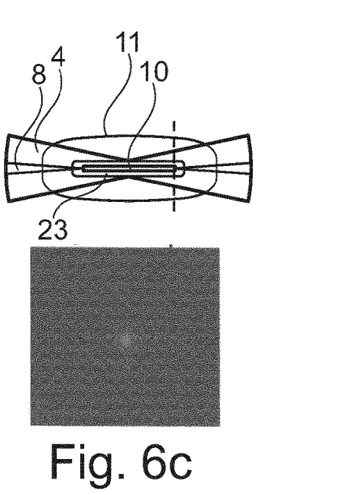

Focal spots obtained at the inlet of the gas medium and at its outlet with and without the plasma channel waveguide 10 are shown in FIGS. 6A-6c. Because of significant aberrations, the focal spot at the entrance of the gas medium 23 has a large part of the energy out of the central spot. Without waveguide, the laser beam 8 diverges in the plasma and its peak intensity is reduced at the plasma outlet (FIG. 6b). In contrast with the plasma channel waveguide 10, a small focal spot is obtained (FIG. 6c). Comparing FIG. 6b and FIG. 6c shows that the laser beam 8 is filtered spatially by the waveguide 10.

Figure 2:
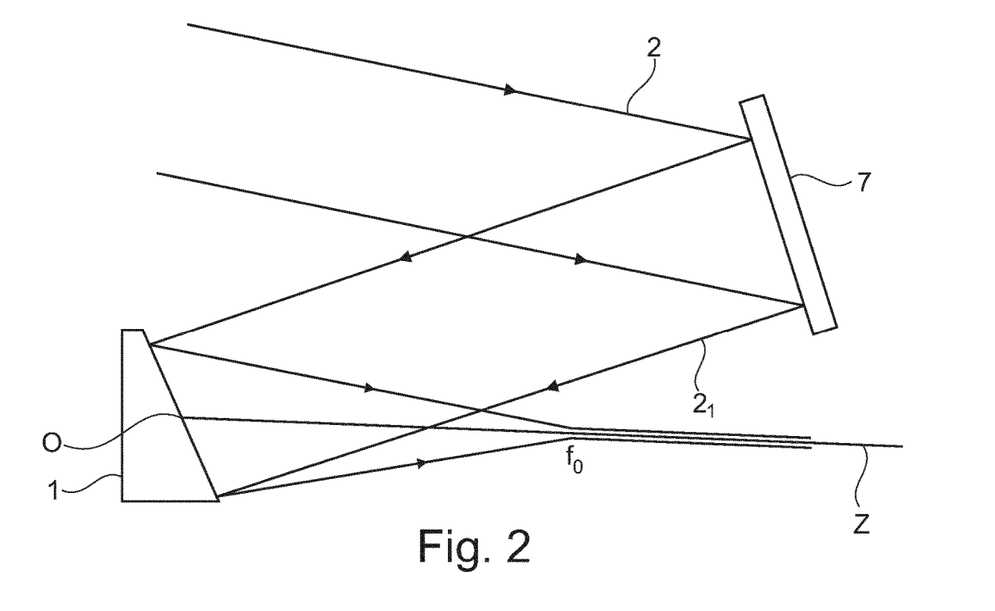
FIG. 2 is an illustration of another embodiment of a method according to the invention.

FIG. 2 displays an example of focalization relying upon a combination of the optical system 100 and a second optics. This second optics may for example be a deformable mirror, a phase plate or a mirror with a spiral phase. Firstly, one first laser beam 2 is produced by a laser source and directed onto the optics 7. Next, the laser beam 2 which is provided from the optics 7 is directed towards the aspheric reflective surface 1. Finally, the reflected beam 21 is focused by the aspheric reflective surface 1 as explained above in the examples of FIGS. 1a, 1b and 1c.

Figure 8:
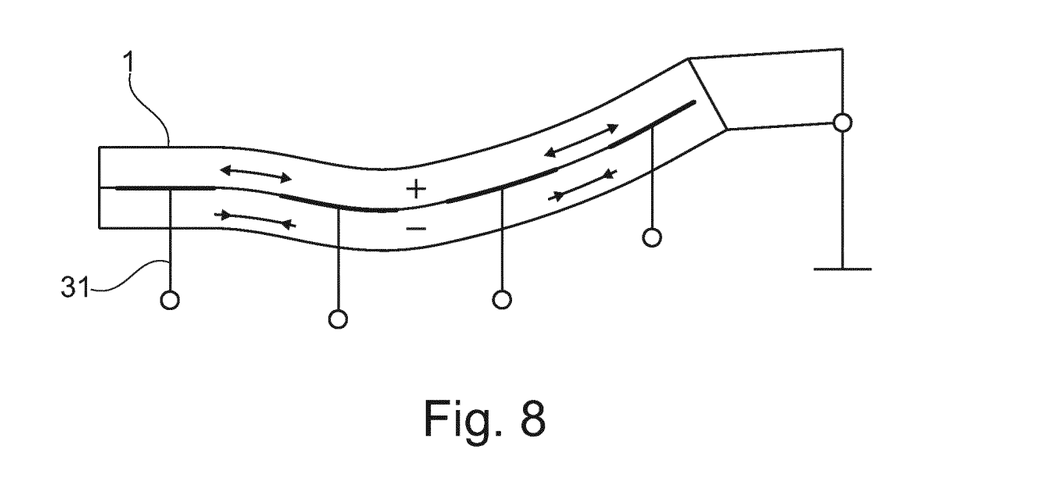
FIG. 8 is an illustration of a deformable aspheric reflective surface.

The reflective aspheric surface 1 or the optics 7 may be deformable, as shown in FIG. 8. The deformable reflective surface shape may be obtained by deforming the reflective surface with actuators 31 or otherwise. In the example of FIG. 8, the reflective aspheric surface 1 may comprise piezoelectric plates which are bonded together and are oppositely polarized (parallel to their axes). An array of electrodes 31 is deposited between the two plates. The front and back surfaces of the plates are connected to ground. The front surface acts as a reflective surface.

When a voltage is applied to an electrode, if affects the shape of the plates.

This variant is of particular interest for focusing a laser beam into a plasma or a gas for acceleration applications. The deformable surface allows to achieve wavefront control through surface deformation and to correct optical aberrations. Hence, one may obtain a laser beam 4 with less or none alignment error.

The combination of the reflective aspheric surface 1 and the optics 7 may also introduce a dephasing in reflection with respect to the case where one reflective surface is used. This dephasing may depend on r, for example the dephasing may be proportional to $r^2$, $r^4$ or $r^6$. By adding a dephasing which is a function of r, it is possible to control the velocity along the focal line. In other words it is possible to tune the two quantities independently. Without this radial dephasing, the focal line and the velocity along the focal line are coupled.

The focusing optics 7 may include a cylindrical reflective optics, a spherical reflective optics or an aspheric reflective optics.

Figure 7:
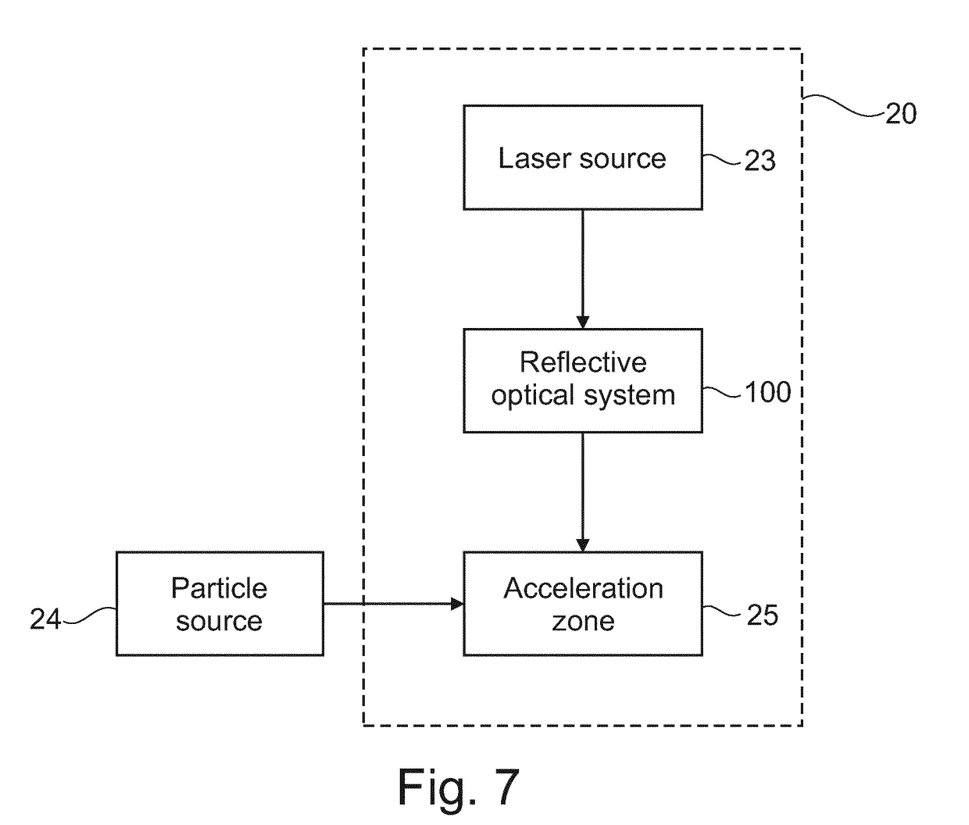
FIG. 7 is a schematic of one embodiment of a vacuum charged particles accelerator.

FIG. 7 shows an example of a vacuum charged particles accelerator. It includes a high intense laser source 25, the reflective system 100, a particle source 24 and a vacuum chamber 20. The vacuum chamber 20 contains the laser system and the reflective system 100. In this setup, the laser source generates a laser pulse which is directed toward the optical system 100. A reflected beam 4 is then obtained thanks to the reflective system 100 and subsequently directed to the charged particles to accelerate them.

The particle source 24 is used to introduce at least one particle into the vacuum chamber 20. The at least one particle is then accelerated by the reflected laser beam 4 within the vacuum chamber 20. In some applications, the at least one accelerated particle may be permitted to exit the vacuum chamber 20.

The at least one introduced particle may be an electron or positron.

The particle source 24 may be a plasma mirror or a metal target, wherein at least one laser pulse generated either by laser source 25 or by any other laser source interact with the target to generate a plasma comprising free electrons.

The particle source 24 may be placed inside vacuum chamber 20 or may be placed outside of vacuum chamber 20.

Vacuum chamber 20 may additionally include electronics and other devices for detecting and measuring properties of the at least one accelerated particle including its position, velocity and energy. The electronics and other devices may be disposed inside or outside chamber 20. As an example, chamber 20 may include photographic elements and a phosphorescent or scintillator screen to measure the at least one accelerated particle position. Alternatively, or in addition, chamber 20 may include detection elements or instruments such as a Faraday cup or other detection devices based upon the deflection of charged particles in a magnetic field.

The injection by the particle source 21 into the vacuum chamber 20 allows the charged particles accelerated by the laser beam to reach energies that are many times greater than their initial energies. For example, electrons may be accelerated to energies up to 200 MeV, 600 MeV, 1000 MeV or more. The invention is not limited to the described embodi-

The invention claimed is:

1. A reflective optical system comprising at least one reflective aspheric surface of focal length $f_0$ and optical axis, the at least one reflective aspheric surface being configured so that a FWHM ((Full Width at Half Maximum) of the intensity of a reflected beam along the optical axis, is larger than the FWHM of the intensity of a focused beam reflected by a parabola having the same focal length $f_0$ and the same optical axis, and receiving the same incident laser beam propagated along an axis of incidence and focused along the optical axis, wherein the at least one reflective aspheric surface is configured so that rays of the incident laser beam that impinge the at least one reflective aspheric surface at a given distance r from the axis of incidence with r≤R, are focused at a distance f(r) from the intersection O of the optical axis with the at least one reflective aspheric surface given by $f(r)=f_0+z_g(r)$, where $z_g(r)$ is a function depending on r and R is distance of the outer rays from the axis of incidence.

2. A system according to claim 1, wherein a sag function s of the at least one reflective aspheric surface satisfies the relation:

$$r\frac{ds}{dr} = s(r) - f(r) + \sqrt{[s(r)-f(r)]^2 + r^2}.$$

3. A system according to claim 2, wherein for integer n>2

$$\left|\frac{d^n s(r)}{dr^n}\right| > 0.$$

4. A system according to claim 2, wherein the sag function s of the at least one reflective aspheric surface has no polar symmetry.

5. A system according to claim 1, wherein the axis of incidence coincides with the optical axis.

6. A system according to claim 1, wherein the axis of incidence makes a non-zero angle θ with the optical axis.

7. A system according to claim 1, wherein the at least one reflective aspheric surface has an opening enabling a second laser beam to pass therethrough.

8. A system according to claim 1, wherein the at least one reflective aspheric surface has a non-continuous surface.

9. A system according to claim 1, wherein the at least one reflective aspheric surface is deformable and the system comprises at least one actuator for deforming the surface.

10. A system according to claim 1, wherein the at least one of the reflective aspheric surface has a spiral phase around the optical axis.

11. A method for generating a plasma channel, comprising:
generating at least one laser pulse, and
focusing the at least one laser pulse in a gas medium to produce the plasma channel, using the reflective optical system of claim 1.

12. A method of guiding a laser pulse, comprising:
generating at least one first laser pulse with a first laser source,
focusing the at least one first laser pulse into a gas medium using the reflective optical system of claim 1, therefore producing a plasma waveguide, and
directing at least one second laser pulse originating from a second laser source along the longitudinal axis of the plasma waveguide channel.

13. A laser-plasma charged particle accelerator, comprising:
a first laser source for generating at least one first laser pulse to produce a plasma channel waveguide,
the reflective optical system of claim 1,
a gas medium in which the at least one first laser pulse is focused by said reflective optical system to produce a plasma channel waveguide, and
particles being accelerated by the first laser source and/or an accelerator comprising a second laser source for generating at least one second laser pulse along the axis of the plasma waveguide channel for accelerating particles.

14. A vacuum laser-plasma charged particle accelerator with a high intensity laser pulse, comprising:
a laser source for generating at least one high intensity laser beam,
an acceleration zone under vacuum,
a particle source to inject particles to be accelerated into said acceleration zone,
the reflective optical system of claim 1 to focus the laser pulse onto the particles to be accelerated in said acceleration zone.

* * * * *